UNITED STATES PATENT OFFICE.

EMILE BINDSCHEDLER, OF PHILADELPHIA, PENNSYLVANIA.

PROCESS FOR THE RECOVERY OF VOLATILE SOLVENTS.

1,367,009. Specification of Letters Patent. Patented Feb. 1, 1921.

No Drawing. Application filed June 18, 1920. Serial No. 389,847.

*To all whom it may concern:*

Be it known that I, EMILE BINDSCHEDLER, a citizen of the Republic of Switzerland, residing in the city and county of Philadelphia, in the State of Pennsylvania, have invented a certain new and useful Improvement in Processes for the Recovery of Volatile Solvents, of which the following is a true and exact description.

The object of my invention is the economical recovery from gaseous mixtures of volatile solvents used in various industries such as for instance in the manufacture of smokeless powder, artificial silk by the nitrocellulose process, artificial leather and filaments.

The problem to be faced in each case is the recovery of such solvents from mixtures of gases or air containing same and it is the more difficult to solve as the ratio between air and solvent decreases.

Among the great number of absorbents already proposed and patented, most of them fail as soon as it comes to recover solvents of considerable vapor pressure even at normal temperature like ether, for instance, expanded in a big volume of air. Such a mixture results in the manufacture of nitrocellulose silk, for instance. In this respect only such absorbents have been proved suitable which give a chemical reaction between the solvent to be recovered and the absorbent. In the case of ethyl-ether, concentrated sulfuric acid and phenols have proved to be suitable absorbents.

Concentrated sulfuric acid gives a high yield of recovery but necessitates a very important and costly installation besides of the inconvenience of the reconcentration involved.

The use of phenols especially of cresol is the object of U. S. Patents 1,315,700 and 1,315,701, by J. H. Bregeat. Cresol is a fairly good absorbent for many solvents and also for ether, although the absorption is not so complete as with concentrated sulfuric acid. The advantage of cresol over sulfuric acid is, however, the ease with which ether can be separated from cresol and the latter used over again. An important inconvenience of cresol is, however, its volatility, the air evolved carrying away a considerable amount of the absorbent which is lost.

I have discovered that the above mentioned disadvantages can be avoided by a combined process of recovery using phenols at first and sulfuric acid subsequently as second absorbents, and my invention consists in the method of recovering solvents in which the gaseous mixture is first passed into intimate contact with phenols, preferably cresol, to extract therefrom the greater part of the solvents, and subsequently the gases admixed with the remaining solvents and with some vapors of phenols, are passed into intimate contact with concentrated sulfuric acid of 60° to 66° B. to extract therefrom the remaining solvents and phenols. The contact referred to will best be effected in an absorption tower through which the acid is repeatedly circulated, means being provided to cool it between its passages through the tower.

The solvents are extracted from the phenols in a well known manner and the solvents and phenols are extracted from the sulfuric acid after it is duly saturated, that is the acid is first diluted with water in about equal volume and then subjected to distillation in a stripping still from which the solvent vapors go over easily and after they have been separated steam is introduced until the phenols are completely stripped. They are then condensed and separated from the water to be used again. The dilute sulfuric acid is concentrated for reuse.

My process provides for a complete and economical recovery of solvents and by a comparatively simple and inexpensive plant, notably the quantities of sulfuric acid used and the apparatus for its use and concentration are only about one-tenth that required for the recovery of solvents by the use of sulfuric acid alone and I avoid losses of solvents and of phenols which are incident to the phenol method as heretofore practised.

Having now described my invention, what I claim as new and desire to secure by Letters Patent, is:

The method of recovering volatile solvents from gaseous mixtures containing such solvents which consists in bringing such mixtures into intimate contact with phenols to bring about the absorption of the greater part of the contained solvent, subsequently bringing the gases from the phenol absorption system into intimate contact with concentrated sulfuric acid to bring about the absorption thereby of such solvent as remains unabsorbed by the phenols and of such phenols as are carried away by the gases, and recovering the solvents and phenols from the absorbents used.

EMILE BINDSCHEDLER.